(12) United States Patent
Cao et al.

(10) Patent No.: US 12,553,503 B2
(45) Date of Patent: Feb. 17, 2026

(54) DIFFERENTIAL SYSTEM

(71) Applicant: Jing-Jin Electric Technologies Co., Ltd., Beijing (CN)

(72) Inventors: Yang Cao, Beijing (CN); Ping Yu, Beijing (CN); Lena Jin, Beijing (CN); Jianwen Li, Beijing (CN); Xuejian Liu, Beijing (CN); Qing Yin, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 0 days.

(21) Appl. No.: 18/990,025

(22) Filed: Dec. 20, 2024

(65) Prior Publication Data

US 2025/0320912 A1    Oct. 16, 2025

(30) Foreign Application Priority Data

Apr. 15, 2024 (CN) .......................... 202410451216.3

(51) Int. Cl.
*F16H 48/24* (2006.01)
*F16D 27/00* (2006.01)
(Continued)

(52) U.S. Cl.
CPC ....... *F16H 48/24* (2013.01); *F16D 2027/005* (2013.01); *F16H 48/08* (2013.01); *F16H 2048/346* (2013.01); *F16H 48/40* (2013.01)

(58) Field of Classification Search
CPC .............. F16D 2027/005; F16H 48/24; F16H 48/30–34; F16H 48/40; F16H 2048/343
See application file for complete search history.

(56) References Cited

U.S. PATENT DOCUMENTS

| 7,294,085 B2 * | 11/2007 | Pistagnesi | F16H 48/24 475/231 |
| 11,686,380 B2 * | 6/2023 | Cao | F16H 48/40 475/160 |

(Continued)

FOREIGN PATENT DOCUMENTS

| CN | 115711281 | 2/2023 |
| CN | 115962268 | 4/2023 |

(Continued)

OTHER PUBLICATIONS

European Search Report for Application No. EP 25155933.2, dated Jul. 17, 2025, 4 pages.

(Continued)

*Primary Examiner* — James J Taylor, II
(74) *Attorney, Agent, or Firm* — Tucker Ellis LLP

(57) ABSTRACT

The differential system comprises a differential, a split clutch and a differential lock clutch. The differential comprises an outer shell and an inner shell, the inner shell is provided inside the outer shell, and the outer shell is configured to be transmission connected with an upper stage transmission structure of the differential. The split clutch is sleeved on the outer shell and configured to engage or disengage the outer shell and the inner shell. The differential lock clutch is sleeved on the outer shell and configured to lock or unlock the differential. The differential lock clutch is capable of locking the differential only when the differential is in an engaged state with the upper stage transmission structure. In the present disclosure, the split clutch is used to complete the engagement or disengagement of the outer shell of the differential with the upper stage transmission structure.

6 Claims, 3 Drawing Sheets

(51) Int. Cl.
*F16H 48/08* (2006.01)
*F16H 48/34* (2012.01)
*F16H 48/40* (2012.01)

(56) References Cited

U.S. PATENT DOCUMENTS 12,234,901 B2 * 2/2025 Lee .................. F16H 48/34
12,270,465 B2 * 4/2025 Yang ................. F16H 48/24
2023/0143681 A1   5/2023 Cao et al.
2024/0408960 A1 * 12/2024 Yang ................. F16H 48/24

FOREIGN PATENT DOCUMENTS

| CN | 116906529 A | * 10/2023 | ............. F16H 48/22 |
| CN | 118728925 A | * 10/2024 | ............. B60K 17/20 |
| DE | 102019115918 | 12/2020 | |

OTHER PUBLICATIONS

European examination report for Application No. EP 25155933.2, dated Jul. 29, 2025, 9 pages.

* cited by examiner

DIFFERENTIAL SYSTEM

PRIORITY

This application claims priority from CN 202410451216.3 filed Apr. 15, 2024, the contents of which are incorporated herein by reference in their entirety.

TECHNICAL FIELD

The present disclosure relates to the technical field of differentials, and in particular to a differential system.

BACKGROUND

The driving modes of automobiles include two-wheel drive and four-wheel drive. To save energy, the two-wheel drive and four-wheel drive modes of vehicles can be switched as needed. Many vehicles are also equipped with a differential. The main function of the differential is to allow the left and right wheels to rotate at different speeds when the automobile turns to adapt to the turning and changes in road conditions. When one side of the wheel loses adhesion (such as slips), the differential may transfer all the torque to the slipping wheel, and the differential lock can limit or lock the function of the differential to ensure that the vehicle can run normally under bad road conditions.

In the prior art, the switching of driving mode of vehicles requires the use of a split clutch, which is mostly friction-based. The cutting-off or transmission of differential power in automobiles is also mostly friction-based.

In the process of realizing the present invention, the inventors found that there are at least the following problems in the prior art: the friction-based split clutch and the friction-based differential lock are both large in size and not convenient to arrange on the vehicle.

SUMMARY

The present disclosure aims to solve one of the technical problems in the prior art at least to a certain extent.

To this end, an object of the present disclosure is to propose a differential system that is small in volume and convenient to arrange on the vehicle to achieve the cutting and transmission of differential power.

To achieve the object, the present disclosure proposes a differential system, which comprises:
  a differential comprising an outer shell and an inner shell, wherein the inner shell is provided inside the outer shell, and the outer shell is configured to be transmission connected with an upper stage transmission structure of the differential;
  a split clutch sleeved on the outer shell and configured to engage or disengage the outer shell and the inner shell; and
  a differential lock clutch sleeved on the outer shell and configured to lock or unlock the differential;
  wherein the differential lock clutch is capable of locking the differential only when the differential is in an engaged state with the upper stage transmission structure.

According to the differential system of the present disclosure, the split clutch is used to complete the engagement or disengagement of the outer shell of the differential with the upper stage transmission structure, that is, to realize the split function of the power transmission of the outer shell and the inner shell, and the differential lock clutch is used to complete the locking or unlocking of the differential, so that the power can be reasonably distributed to the wheels, thereby improving the vehicle's ability to escape from trouble. The present disclosure integrates the split clutch and the differential lock clutch on the outer shell of the differential, occupies a small volume, and has advantages such as a compact structure and being convenient to arrange on the vehicle.

According to an embodiment of the present disclosure, the differential comprises: two half shaft gears, multiple planetary gears, and a planetary gear shaft, the multiple planetary gears are sleeved on the planetary gear shaft, and the two half shaft gears are coaxially provided to face each other and both mesh with the planetary gears.

According to an embodiment of the present disclosure, the differential further comprises a first movable end face gear, the first movable end face gear is provided between the outer shell and the inner shell and is axially movably connected to the outer shell, an outer wall of the first movable end face gear is connected with an inner wall of the outer shell via splines, the inner shell is provided with an inner shell end face gear at an end close to the first movable end face gear, the split clutch is configured to control axial movement of the first movable end face gear, and when the first movable end face gear is meshed with the inner shell end face gear, the outer shell and the inner shell are capable of rotating synchronously.

According to an embodiment of the present disclosure, the half shaft gear is provided with an output shaft, the differential further comprises a second movable end face gear, the second movable end face gear is sleeved on the output shaft and is axially movably connected to the outer shell, an outer wall of the second movable end face gear is connected with the inner wall of the outer shell via splines, the half shaft gear is provided with a half shaft end face gear at an end close to the second movable end face gear, the differential lock clutch is configured to control axial movement of the second movable end face gear, and when the second movable end face gear is meshed with the half shaft end face gear, the outer shell and the half shaft gear are capable of rotating synchronously.

According to an embodiment of the present disclosure, the outer shell comprises a front outer shell and a rear outer shell provided to face each other, the split clutch and the differential lock clutch share a yoke sleeved on the front outer shell, and the yoke is provided with multiple iron cores along a circumferential direction;
  the split clutch comprises:
  a split movable disc having multiple separated first step portions arranged along a circumferential direction, wherein the first step portion is provided with a first groove configured to install a magnet;
  a split magnetic conductive disc provided above the magnet; and
  a split coil sleeved on the iron core and generating an electromagnetic force when energized.

According to an embodiment of the present disclosure, the differential lock clutch comprises:
  a differential lock movable disc having multiple separated second step portions arranged along a circumferential direction, wherein second step portion is provided with a second groove configured to install the magnet, the second step portions are staggered with the first step portions, and bottom end surfaces of the second step portion and the first step portion are located in a same plane;

a differential lock magnetic conductive disc provided above the magnet;

a differential lock coil sleeved on the iron core and generating an electromagnetic force when energized.

According to an embodiment of the present disclosure, the differential system further comprises a position sensor assembly, and the position sensor assembly comprises:

a differential lock sensor coil and a split sensor coil that are sleeved on the iron core;

a sensor iron core provided on the yoke;

a split sensor magnetic conductive disc provided on the first step portion and adjacent to the sensor iron core; and a differential lock sensor magnetic conductive disc provided on the second step portion and adjacent to the sensor iron core.

According to an embodiment of the present disclosure, the split movable disc is provided between the differential lock movable disc and the yoke, and when the split coil and the differential lock coil are not energized, the split movable disc and the differential lock movable disc abut against each other.

According to an embodiment of the present disclosure, the differential system further comprises a first pressing ring, a first elastic member, a first gear engagement positioning pin, a second pressing ring, a second elastic member and a second gear engagement positioning pin;

the first gear engagement positioning pin is provided on the first movable end face gear and faces the split movable disc after passing through the front outer shell, the first pressing ring is provided on an inner wall of the front outer shell, and the first elastic member is compressible between the first pressing ring and the first movable end face gear;

the second gear engagement positioning pin is provided on the second movable end face gear and faces the differential lock movable disc after passing through the front outer shell, the second pressing ring is provided on the inner wall of the front outer shell, and the second elastic member is compressible between the second pressing ring and the second movable end face gear.

According to an embodiment of the present disclosure, after the split clutch disconnects the differential from the upper stage transmission structure, a magnetic attraction force generated when the differential lock coil is energized alone is less than a sum of elastic forces generated when the first elastic member and the second elastic member are compressed.

The additional aspects and advantages of the present disclosure will be partially provided in the following description, some of which will become apparent from the following description, or will be understood through the practice of the present disclosure.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings.

LIST OF REFERENCE NUMERALS

Figure 1:
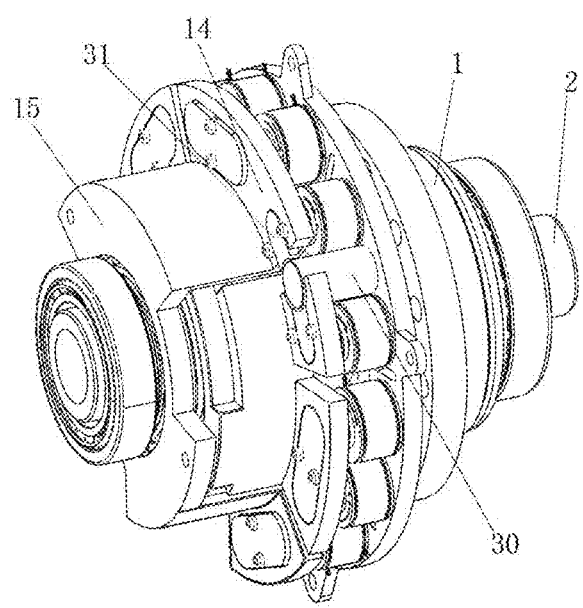
FIG. 1 is a schematic view of the overall structure of a differential system according to an embodiment of the present disclosure.

1, front outer shell; 2, rear outer shell; 3, inner shell; 4, first half shaft gear; 5, planetary gear; 6, planetary gear shaft; 7, first bearing; 8, second half shaft gear; 9, yoke; 10, first pressing ring; 11, first elastic member; 12, first gear engagement positioning pin; 13, second bearing; 14, split movable disc; 15, differential lock movable disc; 16, third bearing; 17, movable disc; 18, second gear engagement positioning pin; 19, second movable end face gear; 20, second elastic member; 21, second pressing ring; 22, differential lock magnetic conductive disc; 23, magnet; 24, split magnetic conductive disc; 25, split coil; 26, differential lock coil; 27, differential lock sensor coil; 28, split sensor coil; 29, split sensor magnetic conductive disc; 30, sensor iron core; 31, differential lock sensor magnetic conductive disc; 32, first movable end face gear.

DETAILED DESCRIPTION

A detailed description of embodiments of the present disclosure is provided below. Examples of the embodiments are shown in the accompanying drawings, throughout which identical or similar reference numerals represent identical or similar components or components with identical or similar functions. The embodiments described below with reference to the accompanying drawings are illustrative and intended only to explain the present disclosure, and cannot be understood as limitations to the present disclosure. On the contrary, the embodiments of the present disclosure include all changes, modifications, and equivalents that fall within the scope of the spirit and content of the attached claims.

As shown in FIGS. 1 to 4, an embodiment of the present disclosure proposes a differential system, which comprises a differential, a split clutch, and a differential lock clutch.

The differential comprises an outer shell and an inner shell 3, and the inner shell 3 is provided in the outer shell. The outer shell can rotate relative to the inner shell 3. In order to facilitate assembly, the outer shell adopts a split design, and comprises a front outer shell 1 and a rear outer shell 2. The outer shell is configured to be transmission connected with an upper stage transmission structure of the differential. The outer shell can be provided thereon with some transmission structures to achieve transmission connection with the upper stage transmission structure. For example, a large gear can be coaxially connected to the outer shell, and the large gear is transmission connected with an upper stage transmission structure.

The split clutch is sleeved on the outer shell and is configured to engage or disengage the outer shell and the inner shell. After the outer shell and the inner shell are engaged, the outer shell and the inner shell rotate synchronously; after the outer shell and the inner shell are disengaged, the outer shell and the inner shell can rotate independently.

The differential lock clutch is sleeved on the outer shell and is configured to lock or unlock the differential. The split clutch and the differential lock clutch can adopt any type of clutch as needed, as long as the clutch can provide linear displacement. For example, electromagnetic clutch, hydraulic coupling clutch and other types can be selected, which have the advantages of high transmission efficiency and fast response. The clutch may be monostable or bistable.

The differential lock clutch can lock the differential only when the differential is in an engaged state with the upper stage transmission structure. The inventors found that when the split clutch is in the disengaged state, the differential lock will cause unilateral power output, which brings uncertainty to driving. To prevent it from happening, the split clutch and the differential lock clutch are mechanically interlocked. The differential lock clutch can engage only when the split clutch is engaged, and the differential lock electromagnetic clutch cannot engage or lock when the split clutch is disengaged.

In the differential system according to the embodiment of the present disclosure, the split clutch is used to complete the engagement or disengagement of the outer shell of the differential with the upper stage transmission structure, that is, to realize the split function of the power transmission of the outer shell and the inner shell, and the differential lock clutch is used to complete the locking or unlocking of the differential, so that the power can be reasonably distributed to the wheels, thereby improving the vehicle's ability to escape from trouble. The present disclosure integrates the split clutch and the differential lock clutch on the outer shell of the differential, occupies a small volume, and has advantages such as a compact structure and being convenient to arrange on the vehicle.

Figure 2:
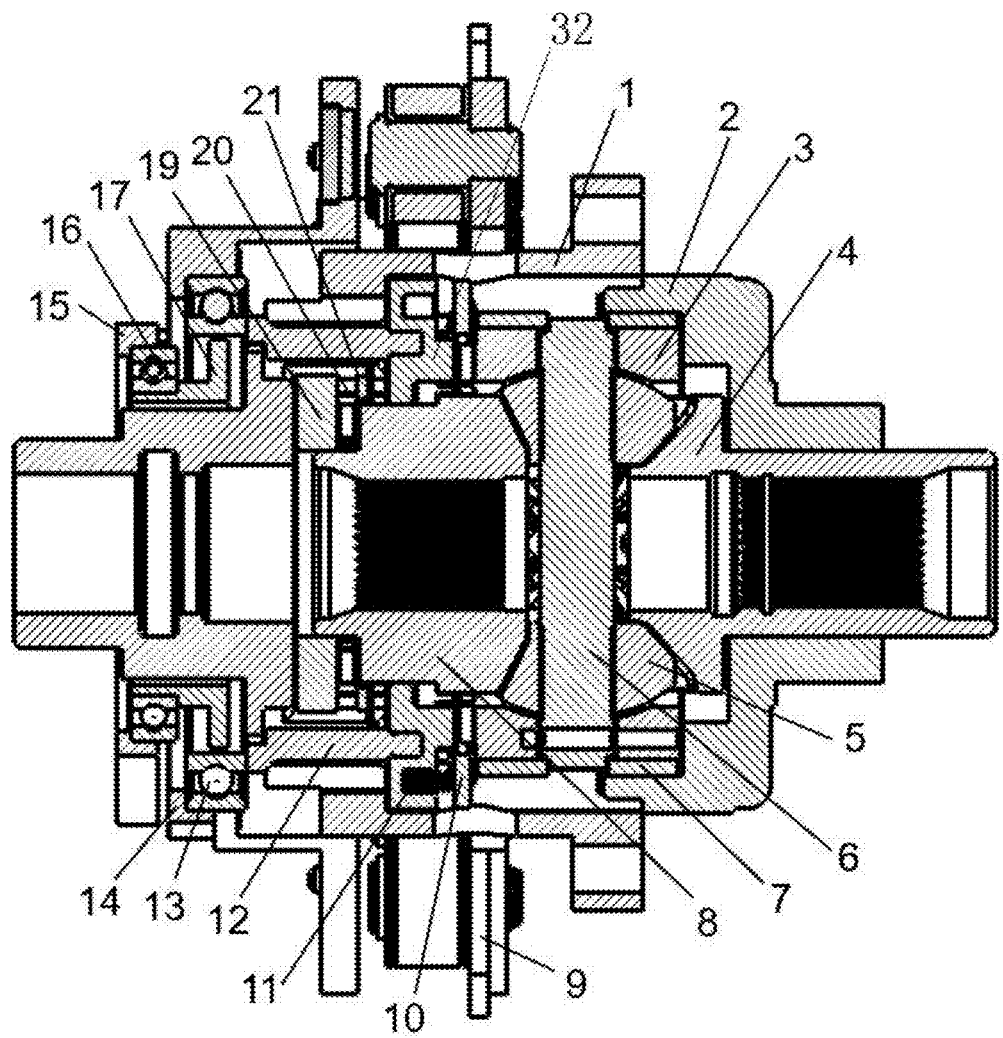
FIG. 2 is a sectional view of a differential system according to an embodiment of the present disclosure.
Figure 3:
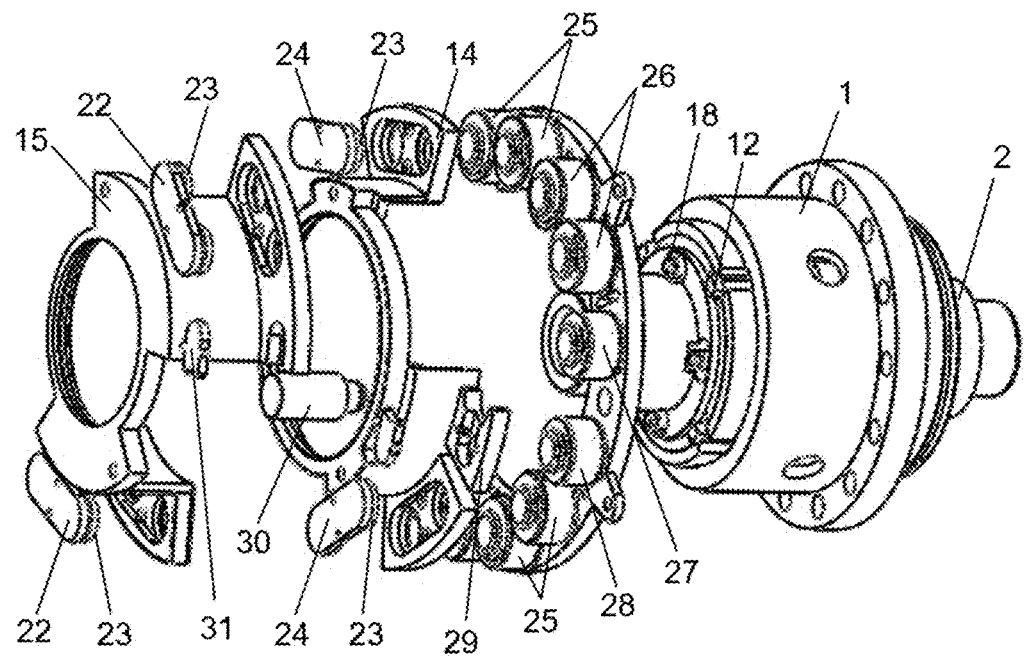
FIG. 3 is an exploded view of a differential system according to an embodiment of the present disclosure.
Figure 4:
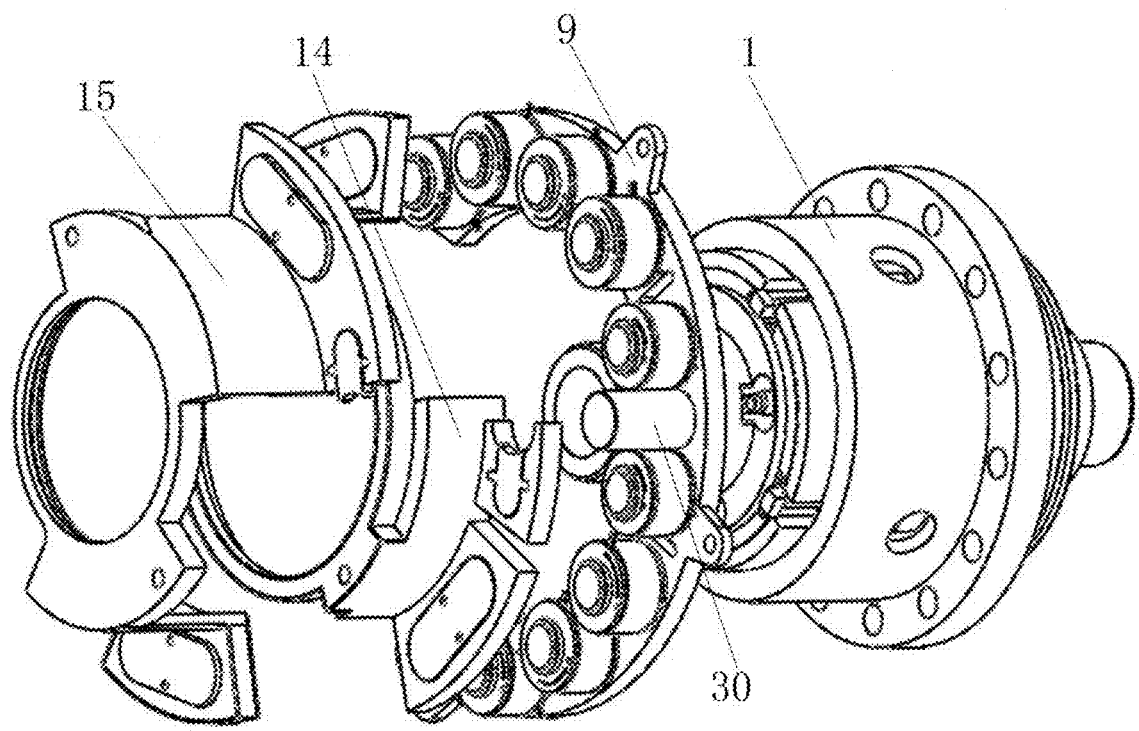
FIG. 4 is an exploded view of the differential system from another angle according to an embodiment of the present disclosure.

In some embodiments, as shown in FIG. 2, the differential comprises: two half shaft gears, multiple planetary gears 5, and a planetary gear shaft 6. The multiple planetary gears 5 are sleeved on the planetary gear shaft 6, and the two half shaft gears are coaxially provided to face each other and both mesh with the planetary gears 5. The two half shaft gears are a first half shaft gear 4 and a second half shaft gear 8. The first half shaft gear 4 and the second half shaft gear 8 can be connected with the half shafts to transmit power to the wheels.

The differential further comprises a first movable end face gear 32, which is provided between the outer shell and the inner shell 3 and is axially movably connected to the outer shell. The outer wall of the first movable end face gear 32 is connected to the inner wall of the outer shell via splines, and the inner shell 3 is provided with an inner shell end face gear at an end close to the first movable end face gear 32. The split clutch is used to control the axial movement of the first movable end face gear 32. When the first movable end face gear 32 is meshed with the inner shell end face gear, the outer shell and the inner shell 3 can rotate synchronously. At this point, the power of the engine is transmitted to the inner shell 3 via the outer shell, and the inner shell 3 transmits the power to the two half shaft gears 4, 8, and then to the half shaft and wheels. The half shaft gears are provided with an output shaft, and the output shaft is connected to the half shaft. When the first movable end face gear 32 is disengaged from the inner shell end face gear, the outer shell and the inner shell 3 can rotate separately. In order to reduce the friction between the outer shell and the inner shell 3, a first bearing 7 is provided between the outer shell and the inner shell 3. As an example, the first bearing 7 may be a needle bearing, which has the advantages of high reliability, high precision and high strength.

The differential further comprises a second movable end face gear 19, which is sleeved on the output shaft and is axially movably connected with the outer shell. The outer wall of the second movable end face gear 19 is connected to the inner wall of the outer shell via splines. The half shaft gear is provided with a half shaft end face gear at an end close to the second movable end face gear 19. The differential lock clutch is used to control the axial movement of the second movable end face gear 19. When the second movable end face gear 19 is meshed with the half shaft end face gear, the outer shell and the half shaft gear can rotate synchronously. The half shaft end face gear can be selectively provided on any half shaft gear. At this point, the power of the engine is transmitted to the inner shell 3 via the outer shell. Since the half shaft gear is locked, the two half shafts and the wheels rotate synchronously.

As an example, the half shaft end face gear is provided on the second half shaft gear 8, and are provided on the same side as the inner shell end face gear, thereby further reducing the occupied volume of the entire differential system.

In some embodiments, as shown in FIGS. 1 to 4, the split clutch and the differential lock clutch both adopt a bistable electromagnetic clutch. The split clutch and the differential lock clutch share a yoke 9, which is sleeved on the front outer shell 1. The yoke 9 is provided with multiple iron cores along the circumferential direction.

The split clutch comprises a split movable disc 14, a split magnetic conductive disc 24 and a split coil 25. The split movable disc 14 has multiple separated first step portions arranged along the circumferential direction, and the first step portion is provided with a first groove configured to install the magnet 23. The magnet 23 is provided to face the split coil 25 so as to facilitates the engagement of the first step portion with the magnet 23. The number of the first step portions is designed according to actual needs. As an example, the number of the first step portions is two. The split magnetic conductive disc 24 is provided above the magnet 23. The split coil 25 is sleeved on the iron core and generates an electromagnetic force after being energized. The energization can be switched between forward energization and reverse energization to generate magnetic poles in different directions.

In an example, two adjacent split coils 25 are provided as a group. The two split coils 25 in the same group form a U-shaped magnetic circuit with the yoke 9 after being energized, and then form a closed annular magnetic circuit through the corresponding magnet 23 and the split magnetic conductive disc 24. In this way, the occurrence of magnetic leakage can be effectively avoided, thereby improving the electromagnetic utilization rate.

The differential lock clutch comprises a differential lock movable disc 15, a differential lock magnetic conductive disc 22 and a differential lock coil 26. The differential lock movable disc 15 has multiple separated second step portions arranged in the circumferential direction, and the second step portion is provided with a second groove configured to install the magnet 23. The second step portions are staggered with the first step portions, and the bottom end surfaces of the second step portion and the first step portion are located in the same plane. The differential lock magnetic conductive disc 22 is provided above the magnet 23, and the magnet 23 is provided to face the differential lock coil 26 so as to facilitate the engagement of the second step portion with the magnet 23. The number of the second step portions is designed according to actual needs. As an example, the number of the second step portions is two. The differential lock coil 26 is sleeved on the iron core and generates an electromagnetic force after being energized. The energization can be switched between forward energization and reverse energization to generate magnetic poles in different directions.

Similar to the split coils 25, two adjacent differential lock coils 26 are provided as a group, which has a similar technical effect to the split coils 25.

In some embodiments, in order to detect the position of the split movable disc 14 and the differential lock movable disc 15, the differential system further comprises a position sensor assembly, which comprises a differential lock sensor coil 27, a split sensor coil 28, a sensor iron core 30, a split sensor magnetic conductive disc 29 and a differential lock sensor magnetic conductive disc 31.

The differential lock sensor coil 27 and the split sensor coil 28 are sleeved on the iron core. The differential lock sensor coil 27 is provided to face the second step portion, and the split sensor coil 28 is provided to face the first step portion. The sensor core 30 is provided on the yoke 9. The split sensor magnetic conductive disc 29 is provided on the first step portion and adjacent to the sensor core 30. The differential lock sensor magnetic conductive disc 31 is provided on the second step portion and adjacent to the sensor core 30. The working principle of the position sensor assembly is based on the law of magnetic field induction, that is, when a conductor moves in a magnetic field, an induced electromotive force is generated at both ends of the conductor. Specifically, when the differential lock sensor coil 27 is close to the differential lock movable disc 15, and/or the split sensor coil 28 is close to the split movable disc 14, the magnetic field of the movable disc itself will affect the magnetic field distribution around the sensor coil, thereby changing the magnetic flux in the sensor coil, and the position of the movable disc can be obtained by amplification, filtering and other processing.

The split movable disc 14 is provided between the differential lock movable disc 15 and the yoke 9. When neither the split coil 25 nor the differential lock coil 26 is energized, the split movable disc 14 and the differential lock movable disc 15 abut against each other. Even if the differential lock coil 26 is energized, the split movable disc 14 will not leave room for the differential lock movable disc 15 to move.

The differential of the differential system further comprises a first pressing ring 10, a first elastic member 11, a first gear engagement positioning pin 12, a second pressing ring 21, a second elastic member 20 and a second gear engagement positioning pin 18.

The first gear engagement positioning pin 12 is provided on the first movable end face gear 32, and faces the split movable disc 14 after passing through the front outer shell 1. The first pressing ring 10 is provided on the inner wall of the front outer shell 1. The first elastic member 11 can be compressed between the first pressing ring 10 and the first movable end face gear 32. The first pressing ring 10 can be fixed on the front outer shell 1 by interference press fit. The engagement action of the first movable end face gear 32 can be completed by controlling the axial movement of the first gear engagement positioning pin 12.

The second gear engagement positioning pin 18 is provided on the second movable end face gear 19, and faces the differential lock movable disc 15 after passing through the front outer shell 1. The second pressing ring 21 is provided on the inner wall of the front outer shell 1. The second elastic member 20 can be compressed between the second pressing ring 21 and the second movable end face gear 19. The second pressing ring 21 can be fixed on the front outer shell 1 by interference press fit. The engaging action of the second movable end face gear 19 can be completed by controlling the axial movement of the second gear engagement positioning pin 18.

After the split clutch disengages the differential from the upper stage transmission structure, the magnetic attraction force generated when the differential lock coil 26 is energized alone is less than the sum of the elastic forces generated when the first elastic member 11 and the second elastic member 20 are compressed. In this way, the split clutch and the differential lock clutch form a mechanical interlock. The differential lock clutch can engage only when the split clutch is engaged. The differential lock electromagnetic clutch cannot engage or lock when the split clutch is disengaged.

The bistable self-retention of the electromagnetic clutch is self-retained by elastic members and magnet 23 respectively. No power is required when maintaining the disengagement or engagement state, which saves energy.

A second bearing 13 is provided outside the differential to push the first gear engagement positioning pin 12. Specifically, the outer ring of the second bearing 13 is connected to the inner wall of the split movable disc 14, and the inner ring of the second bearing 13 is used to abut against the first gear engagement positioning pin 12. In an example, the second bearing 13 and the first gear engagement positioning pin 12 can also be provided with other movable parts to realize power transmission.

In order to form a power transmission path between the differential lock movable disc 15 and the second gear engagement positioning pin 18, a movable disc 17 is provided outside the differential, and the movable disc 17 is connected to the second gear engagement positioning pin 18. A third bearing 16 is provided between the movable disc 17 and the differential lock movable disc 15, which can make the movable disc 17 and the differential lock movable disc 15 rotate relative to each other. Specifically, the outer ring of the third bearing 16 is connected to the inner wall of the differential lock movable disc 15, and the inner ring of the third bearing 16 is connected to an end of the movable disc 17.

It should be noted that in the description of the present disclosure, the terms "first", "second", etc. are only used for descriptive purposes and should not be understood as indicating or implying relative importance. Furthermore, in the description of the present disclosure, unless otherwise specified, "multiple" or "a plurality of" means two or more.

In the present disclosure, unless otherwise specified and defined, the terms such as "installation", "connection", "fixation" should be understood in a broad sense, for example, it may be fixedly connected, or detachably connected, or integrally connected; it may also be mechanically connected, electrically connected, or telecommunicated with each other; it may be directly connected or indirectly connected through a middleware; it may also be internally communicated or interacted between two components. For a person of ordinary skill in the art, the specific meaning of these terms in the present disclosure should be understood according to specific situations.

In the present disclosure, unless otherwise specified and defined, the first feature is located "on" or "beneath" the second feature may be that the first and second features are in direct contact or in indirect contact through an intermediate medium. Moreover, the first feature is "above" the second feature may be that the first feature is directly or diagonally above the second feature, or only indicate that the first feature is horizontally higher than the second feature. The first feature "below" or "under" the second feature may be that the first feature is directly or diagonally below the second feature, or only indicate that the horizontal height of the first feature is less than that of the second feature.

In the description of the present disclosure, the terms "left", "right", "front", "rear", etc. indicate the orientation or position relationship based on the orientation or position relationship shown in the drawings, only for the convenience of describing the present disclosure and simplifying the description, and not to indicate or imply that the device or element referred to must have a specific orientation, be constructed and operated in a specific orientation, and therefore cannot be understood as a limitation of the present disclosure.

The description of any process or method in a flowchart or otherwise described herein may be understood as comprising one or more modules, fragments, or portions of codes of executable instructions for implementing specific logical functions or procedures, and the scope of preferred embodiments of the present disclosure comprises other implementations, which may not be in the order shown or discussed, including performing functions in a fundamentally simultaneous manner or in reverse order based on the functions involved. This should be understood by those skilled in the art.

In the description of this specification, terms such as "an embodiment", "some embodiments", "an example", "a specific example", or "some examples" means that the specific features, structures, materials, or features described in conjunction with the embodiments or examples are included in at least one embodiment or example of the present disclosure. In this specification, the illustrative description of the above terms may not necessarily refer to the same embodiments or examples. Moreover, the specific features, structures, materials, or characteristics described can be combined in an appropriate manner in any one or more embodiments or examples.

Although embodiments of the present disclosure have been shown and described above, it can be understood that the above embodiments are exemplary and cannot be understood as a limitation of the present disclosure. A person of ordinary skill in the art may make changes, modifications, substitutions, and variations to the above embodiments within the scope of the present disclosure.

What is claimed is:

1. A differential system, comprising:
    a differential comprising an outer shell and an inner shell, wherein the inner shell is provided inside the outer shell, and the outer shell is configured to be transmission connected with an upper stage transmission structure of the differential;
    a split clutch sleeved on the outer shell and configured to engage or disengage the outer shell and the inner shell; and
    a differential lock clutch sleeved on the outer shell and configured to lock or unlock the differential;
    wherein the differential lock clutch is capable of locking the differential only when the differential is in an engaged state with the upper stage transmission structure,
    the differential comprises: two half shaft gears, multiple planetary gears, and a planetary gear shaft, the multiple planetary gears are sleeved on the planetary gear shaft, and the two half shaft gears are coaxially provided to face each other and both mesh with the planetary gears,
    the differential further comprises a first movable end face gear, the first movable end face gear is provided between the outer shell and the inner shell and is axially movably connected to the outer shell, an outer wall of the first movable end face gear is connected with an inner wall of the outer shell via splines, the inner shell is provided with an inner shell end face gear at an end close to the first movable end face gear, the split clutch is configured to control axial movement of the first movable end face gear, and when the first movable end face gear is meshed with the inner shell end face gear, the outer shell and the inner shell are capable of rotating synchronously,
    a respective one of the half shaft gears is provided with an output shaft, the differential further comprises a second movable end face gear, the second movable end face gear is sleeved on the output shaft and is axially movably connected to the outer shell, an outer wall of the second movable end face gear is connected with the inner wall of the outer shell via splines, the respective one of the half shaft gears is provided with a half shaft end face gear at an end close to the second movable end face gear, the differential lock clutch is configured to control axial movement of the second movable end face gear, and when the second movable end face gear is meshed with the half shaft end face gear, the outer shell and the respective one of the half shaft gears are capable of rotating synchronously,
    wherein the outer shell comprises a front outer shell and a rear outer shell provided to face each other,
    the split clutch and the differential lock clutch share a yoke sleeved on the front outer shell, and the yoke is provided with multiple iron cores along a circumferential direction;
    the split clutch comprises:
    a split movable disc having multiple separated first step portions arranged along the circumferential direction, wherein the first step portions are provided with a first groove configured to install a magnet;
    a split magnetic conductive disc provided above the magnet; and
    a split coil sleeved on a respective one of iron cores and generating an electromagnetic force when energized.

2. The differential system according to claim 1, wherein the differential lock clutch comprises:
    a differential lock movable disc having multiple separated second step portions arranged along the circumferential direction, wherein the second step portions are provided with a second groove configured to install a magnet, the second step portions are staggered with the first step portions, and bottom end surfaces of the second step portions and the first step portions are located in a same plane;
    a differential lock magnetic conductive disc provided above the magnet;
    a differential lock coil sleeved on a respective one of the iron cores and generating an electromagnetic force when energized.

3. The differential system according to claim 2, wherein the differential system further comprises a position sensor assembly, and the position sensor assembly comprises:
    a differential lock sensor coil and a split sensor coil that are sleeved on respective iron cores;
    a sensor iron core provided on the yoke;
    a split sensor magnetic conductive disc provided on one of the first step portions and adjacent to the sensor iron core; and
    a differential lock sensor magnetic conductive disc provided on one of the second step portions and adjacent to the sensor iron core.

4. The differential system according to claim 3, wherein the split movable disc is provided between the differential lock movable disc and the yoke, and when the split coil and the differential lock coil are not energized, the split movable disc and the differential lock movable disc abut against each other.

5. The differential system according to claim 4, wherein the differential system further comprises a first pressing ring, a first elastic member, a first gear engagement positioning pin, a second pressing ring, a second elastic member and a second gear engagement positioning pin;

the first gear engagement positioning pin is provided on the first movable end face gear and faces the split movable disc after passing through the front outer shell, the first pressing ring is provided on the inner wall of the front outer shell, and the first elastic member is compressible between the first pressing ring and the first movable end face gear;

the second gear engagement positioning pin is provided on the second movable end face gear and faces the differential lock movable disc after passing through the front outer shell, the second pressing ring is provided on the inner wall of the front outer shell, and the second elastic member is compressible between the second pressing ring and the second movable end face gear.

6. The differential system according to claim 5, wherein after the split clutch disengages the differential from the upper stage transmission structure, a magnetic attraction force generated when the differential lock coil is energized alone is less than a sum of elastic forces generated when the first elastic member and the second elastic member are compressed.

\* \* \* \* \*